United States Patent
Fischer et al.

(10) Patent No.: US 8,542,405 B2
(45) Date of Patent: Sep. 24, 2013

(54) INK REDUCTION METHOD

(75) Inventors: Timothy A. Fischer, Mendota Heights, MN (US); Christopher J. Edge, St. Paul, MN (US)

(73) Assignee: Eastman Kodak Company, Rochester, NJ (US)

( * ) Notice: Subject to any disclaimer, the term of this patent is extended or adjusted under 35 U.S.C. 154(b) by 125 days.

(21) Appl. No.: 13/280,683

(22) Filed: Oct. 25, 2011

(65) Prior Publication Data

US 2013/0100465 A1 Apr. 25, 2013

(51) Int. Cl.
*H04N 1/60* (2006.01)

(52) U.S. Cl.
USPC .......................................................... 358/1.9

(58) Field of Classification Search
None
See application file for complete search history.

(56) References Cited

U.S. PATENT DOCUMENTS

| | | | | |
|---|---|---|---|---|
| 6,058,207 A * | 5/2000 | Tuijn et al. | | 382/162 |
| 6,724,507 B1 * | 4/2004 | Ikegami et al. | | 358/518 |
| 7,057,765 B1 * | 6/2006 | Fischer et al. | | 358/1.9 |
| 7,433,102 B2 * | 10/2008 | Takahashi et al. | | 358/518 |
| 7,495,804 B2 * | 2/2009 | Rozzi | | 358/1.9 |
| 7,573,621 B2 * | 8/2009 | Yao | | 358/518 |
| 7,808,678 B2 * | 10/2010 | Miyazaki | | 358/3.01 |
| 7,982,908 B2 * | 7/2011 | Kita et al. | | 358/1.9 |
| 8,009,325 B1 * | 8/2011 | Borg | | 358/1.9 |
| 8,077,353 B2 * | 12/2011 | Wada | | 358/1.9 |
| 8,233,705 B2 * | 7/2012 | Rozzi et al. | | 382/162 |
| 8,339,666 B2 * | 12/2012 | Kaneko | | 358/1.9 |
| 2005/0083346 A1 * | 4/2005 | Takahashi et al. | | 345/600 |
| 2005/0248789 A1 * | 11/2005 | Kita et al. | | 358/1.9 |
| 2008/0158610 A1 * | 7/2008 | Miyazaki | | 358/3.01 |
| 2010/0110457 A1 * | 5/2010 | Kaneko | | 358/1.9 |
| 2010/0277493 A1 * | 11/2010 | Tin | | 345/589 |
| 2011/0134449 A1 * | 6/2011 | Seto | | 358/1.9 |
| 2012/0050767 A1 * | 3/2012 | Tanaka | | 358/1.9 |
| 2012/0229461 A1 * | 9/2012 | Rozzi et al. | | 345/419 |
| 2012/0230584 A1 * | 9/2012 | Kubo et al. | | 382/167 |
| 2013/0100465 A1 * | 4/2013 | Fischer et al. | | 358/1.9 |
| 2013/0100466 A1 * | 4/2013 | Fischer et al. | | 358/1.9 |

OTHER PUBLICATIONS

Sharma et al., "IPA Ink Optimization RoundUP 2010", white paper presented at the 2010 IDEAlliance/IPA Technical Conference.*

* cited by examiner

*Primary Examiner* — Tammy Pham
*Assistant Examiner* — Edwin S Leland, III
(74) *Attorney, Agent, or Firm* — Kevin E. Spaulding

(57) ABSTRACT

A method for forming a color transform for a color printing device having a plurality of colorant channels that includes applying a tone scale adjustment function and a total colorant load limit. An optimization process is used to optimize a merit function including a tone scale reproduction accuracy term and a gamut shape term. The method involves determining an initial merit function value responsive to an initial total colorant load limit and an initial set of tone scale adjustment parameters for a tone scale adjustment function. Modified tone scale adjustment parameters and a modified total colorant load limit are determined that provide an improved merit function value subject to a constraint that an average total colorant load is no more than a predefined threshold for a predefined distribution of input colors.

19 Claims, 11 Drawing Sheets

FULL COLOR GAMUT

TAC LIMITED COLOR GAMUT

INK REDUCTION METHOD

CROSS-REFERENCE TO RELATED APPLICATIONS

Reference is made to commonly assigned, co-pending U.S. patent application Ser. No. 13/280,702, entitled: "Improved method of ink reduction", by Fischer et al., which is incorporated herein by reference.

FIELD OF THE INVENTION

The invention relates to color imaging, and more particularly, to ink reduction techniques for color printing devices.

BACKGROUND OF THE INVENTION

Ink optimization and total ink reduction has become an important new feature in various color management systems. For example, at the recent 2010 Technical Conference for the IDEAlliance/IPA, several ink-optimizing products were compared (see Sharma et al., "IPA Ink Optimization RoundUP 2010," white paper presented at the 2010 IDEAlliance/IPA Technical Conference). These products attempt to reduce the amount of CMYK ink with little or no loss in color reproduction accuracy. Hence, these products were compared both in terms of the amount of ink reduction that was achieved, as well as in the preservation of appearance of converted CMYK images.

Three ways in which the total or average CMYK ink can be reduced is by increasing the amount of black ink in substitution for a corresponding reduction of CMY ink (GCR), applying cut-back curves to the individual channels (essentially applying a scale factor that is <1.0), and by lowering the limit on the total amount of ink that can be applied at any one location ("total area coverage" or TAC). Historically, these calculations are performed in the device coordinate space of the printing system being optimized, for example CMYK. Additionally, modifications to the perceptual tone reproduction can be used to reduce the overall ink load and this may be utilized in combination with the methods described herein to achieve a given targeted average ink load.

An advantage of the historical approaches is that the mathematical functions applied are relatively simple. However, a disadvantage is that the volume of the color gamut can often be greatly reduced, particularly in the region extending from saturated primaries (CMY) and secondaries (RGB) to the black point of the color gamut (i.e., the darkest color that can be printed given the ink load restrictions imposed). An excessive narrowing below the girdle of the color gamut is sometimes referred to as the "tornado effect" and can be exemplified in FIG. 1, which compares a full color gamut 100 for a CMYK printing system to a TAC-limited color gamut 105 that has been restricted by a very low value of TAC. The severe concavities associated with the TAC limited color gamut 105 can often have a significant impact on the resulting image quality. Another disadvantage is that the color reproduction accuracy may be sacrificed when utilizing a device coordinate transform based approach rather than a colorimetric approach.

Various complex solutions can be proposed in order to avoid this effect in the case of GCR by utilizing a colorimetric GCR approach. For example, in U.S. Pat. No. 7,495,804, to Rozzi, entitled "Gamut-preserving color imaging," which is incorporated herein by reference, teaches a colorimetric GCR method that includes tracing out a locus of colorant values having different K values that can all achieve a given value of $L^*a^*b^*$ in conjunction with different values of CMY, as described. However, this approach does not address the problem that is encountered when attempting to keep the total ink below a designated TAC level when all colorimetric solutions on the locus of colorant values are above that TAC limit.

There remains a need for a method to form color transforms for a color printing device that can provide aggressive reductions in average total colorant load without producing an unnecessary loss of image quality or perceptual color reproduction.

SUMMARY OF THE INVENTION

The present invention represents a method for forming a color transform for a color printing device having a plurality of colorant channels, each having an associated colorant control value, comprising:

determining a device characterization transform that relates colorant control values to device-independent color values;

defining a tone scale adjustment function having one or more tone scale adjustment parameters;

defining a merit function including a tone scale reproduction accuracy term which is responsive to the tone scale adjustment function and a gamut shape term which is responsive to a color gamut shape;

defining an initial total colorant load limit;

determining an initial color gamut shape responsive to the device characterization transform and the initial total colorant load limit;

determining an initial merit function value corresponding to an initial set of tone scale adjustment parameters and the initial total colorant load limit;

using a data processor to determine modified set of tone scale adjustment parameters and a modified total colorant load limit that provides an improved merit function value relative to the initial merit function value, wherein the improved merit function value is determined responsive to a modified tone scale adjustment function corresponding to the modified set of tone scale adjustment parameters and a modified color gamut shape corresponding to the modified total colorant load limit; and determining a color transform for transforming input color values for an input digital image to colorant control values for the color printing device responsive to the modified set of tone scale adjustment parameters and the modified total colorant load limit;

wherein the modified set of tone scale adjustment parameters and the modified total colorant load limit are determined subject to a constraint that an average total colorant load is no more than a predefined threshold for a set of printed colors produced by applying the color transform to a predefined distribution of input colors.

This invention has the advantage that it can achieve very large reductions in both the average and maximum amounts of ink while minimizing the impact on the perceptual image quality by reducing concavities in color gamut.

It has the additional advantage that it can reduce the amount of ink required to create an image on printing devices with minimal loss of quality of appearance. The invention is helpful both for minimizing ink cost and as well as for reducing possible negative effects of ink on paper such as wrinkling

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
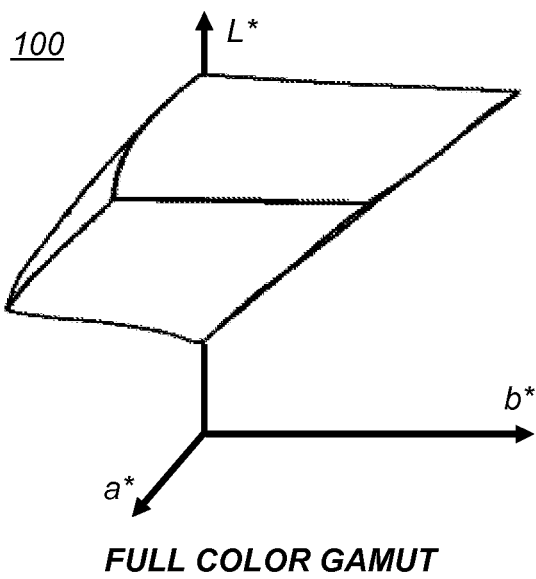
FIG. 1 compares a full color gamut for an exemplary color printing device to a TAC-limited color gamut resulting from a low TAC limit.
Figure 1:
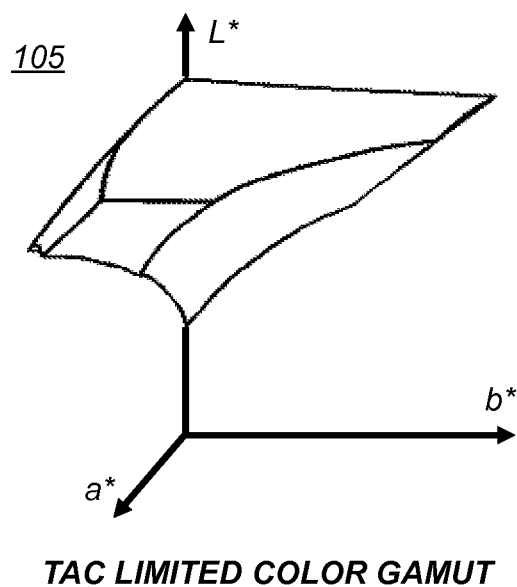
Figure 2:
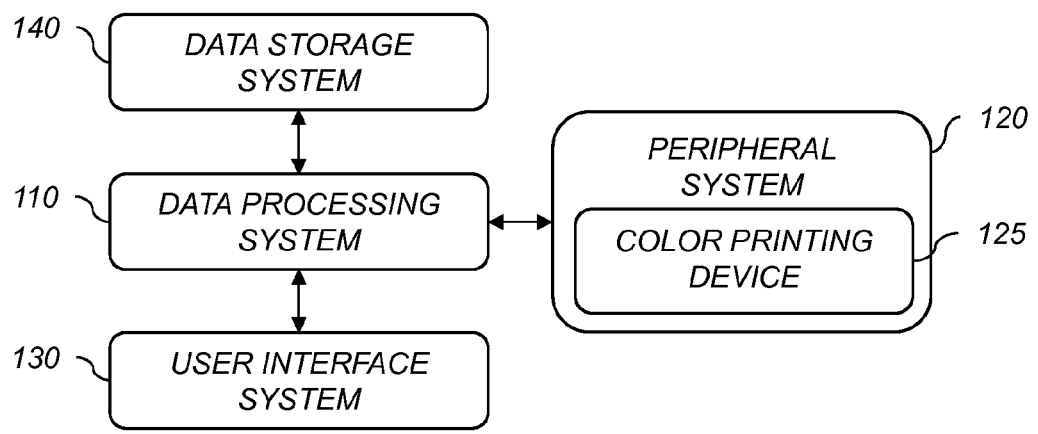
FIG. 2 is a high-level diagram showing the components of a system for forming a color transform according to an embodiment of the present invention.

FIG. 2 is a high-level diagram showing the components of a system for forming a color transform according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the programming instructions and other information needed to execute the processes of the various embodiments of the present invention, including the example methods described herein for forming color transforms. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

In some embodiments, program code implementing methods for forming a color transform in accordance with the present invention can be loaded into the memory of data processing system 110 from an external storage device (e.g., a hard drive or a removable media drive) which is a part of the data storage system 140. The program code can be initially carried on computer-readable media such as magnetic, optical, magneto-optic or other disk or tape media. Alternatively, the program code may be loaded into the memory of data processing system 110 from electronic computer-readable media such as electrically-erasable-programmable-read-only-memory (EEPROM), or downloaded over a network connection. If downloaded, the program code may be initially embedded in a carrier wave or otherwise transmitted on an electromagnetic signal. The program code may be embodied as a feature in an application program providing a wide range of imaging functionality.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110 or to display or print digital content received from the data processing system 110. For example, the peripheral system 120 may include digital still cameras, digital video cameras, cellular phones, digital printers, digital soft-copy displays or other data processors. The data processing system 110, upon receipt of digital content records from a device in the peripheral system 120, may store such digital content records in the data storage system 140 or may output it on another device in the peripheral system. In a preferred embodiment, the peripheral system 120 includes at least one color printing device 125 for printing color image data.

The user interface system 130 may include a keyboard, a mouse, a trackball, a touchpad, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 2.

In the discussion that follows, many aspects of the invention are described with reference to ink reduction on a particular printing system. However the invention is not limited in that respect. For example, the method of the present invention is readily applicable to many different types of printing devices, including printing presses, electrophotographic printers, drop-on-demand inkjet printers, continuous inkjet printers or dot-matrix printers. Accordingly, the detailed discussion is meant to be an exemplary description of one embodiment in accordance with the invention.

Figure 3:
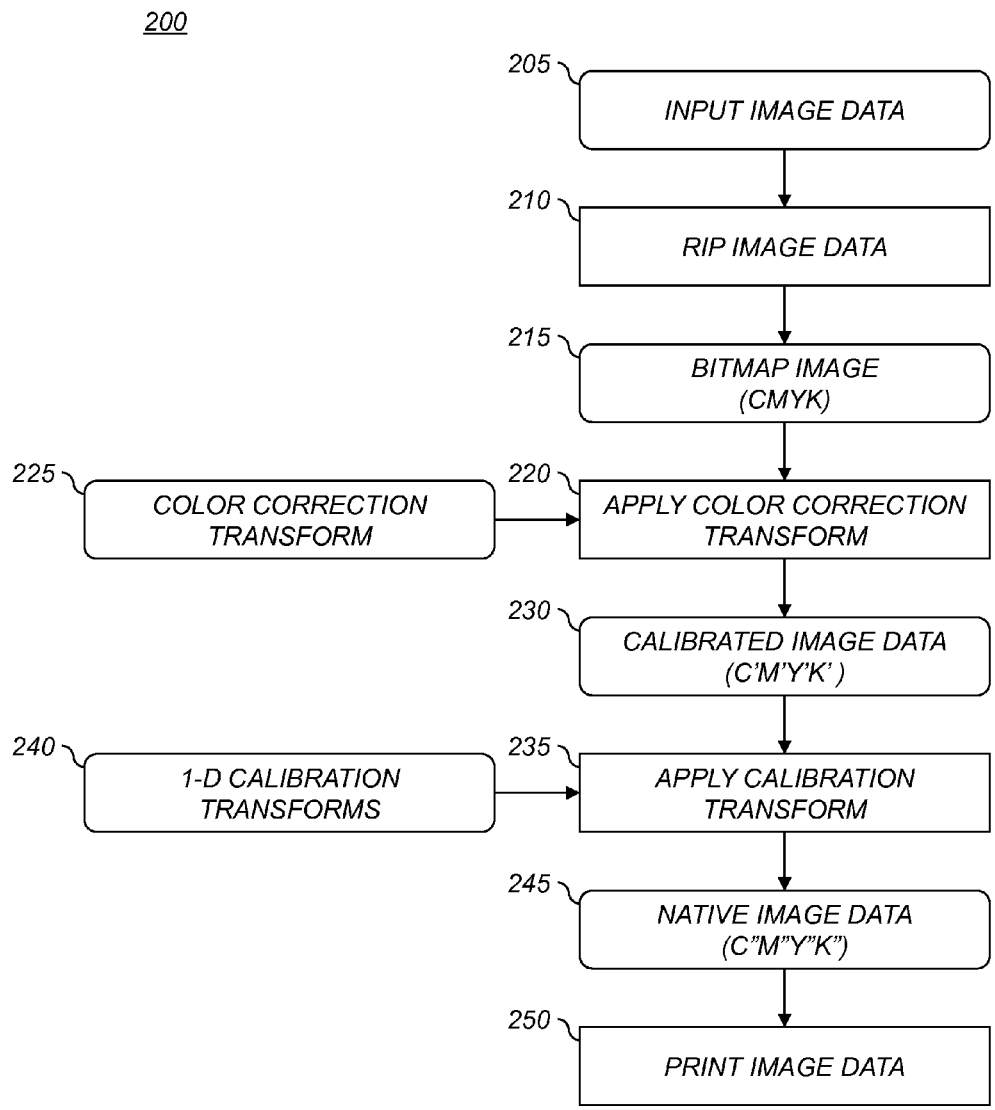
FIG. 3 is a functional block diagram of a method for printing an input digital image on a color printing system.

FIG. 3 is a flow diagram for a color printing process 200 that is used to print input image data 205 on a particular color printing device 125 (FIG. 2) in accordance with an embodiment of the present invention. Generally, some or all of the steps in the color printing process 200 will be performed using the data processing system 110 (FIG. 2).

The input image data 205 includes information describing the content of one or more pages that are to be printed. In some embodiments, the input image data 205 is stored in the well-known format of a PDF file. In other embodiments, the input image data 205 may be stored in some other format such as a raster image file.

A RIP image data step 210 is used to form a bitmap image 210 corresponding to the input image data 205. Typically, the bitmap image 210 will be in a standard color space, such as the well-known SWOP CMYK color space. In other embodiments, the bitmap image 215 can be in different CMYK color spaces, or even other color spaces such as RGB or L*a*b* color spaces.

The color response of most color printing devices 125 (FIG. 2) will generally differ from the standard color space associated with the bitmap image 215. An apply color correction transform step 220 is used to apply a color correction transform 225 to determine corresponding calibrated image data 230. The calibrated image data 230 will be represented in terms of calibrated colorant control values (e.g., C'M'Y'K') corresponding to the colorant channels of the color printing device 125. In a preferred embodiment, the color printing device 125 is a CMYK printing device having cyan, magenta, yellow and black colorant channels. However, in other embodiments, the color printing device 125 can use other combinations of colorant channels (e.g., cyan, magenta and yellow (C'M'Y'); dark cyan, light cyan, dark magenta, light magenta, yellow and black (C'c'M'm'YK); or cyan, magenta, yellow, black, orange and green (C'M'Y'K'O'G')).

The color correction transform 225 can be stored using any transform format known in the art. In a preferred embodiment, the color correction transform 225 is stored an ICC device link profile. These types of profiles typically include a multi-dimensional look-up table (LUT) that stores the calibrated colorant control values (e.g., C'M'Y'K' values) for a lattice of input code values (e.g., CMYK values). A multi-dimensional interpolation process can then be used to interpolate between the stored lattice points to determine the calibrated colorant control values for the input color values of the pixels in the bitmap image 215.

The calibrated image data 230 is designed to be used by the color printing device 125 when it is calibrated to respond according to a predefined tone reproduction aim curve (e.g., to have a predefined density vs. colorant control value relationship). Any particular color printing device 125 will generally not respond exactly according to the predefined tone reproduction aim curve. An apply calibration transform step 235 is used to apply a set of one-dimensional (1-D) calibration transforms 240 (one for each colorant channel) to the calibrated image data 230 to produce native image data 245 that is in a color space (e.g., C"M"Y"K") that is appropriate to print on the color printing device 125 using a print image data step 250. The 1-D calibration transforms 240 can be represented using any format known in the art. They are typically represented using 1-D look-up tables (LUTs) or splines.

In a preferred embodiment, the 1-D calibration transforms are used to correct the native response of the color printing device 125 so that it closely matches the tone reproduction characteristics of a standard color space (e.g., SWOP CMYK with a specified level of dot gain). In some cases, the apply calibration transform step 235 is applied inside the color printing device 125 so that the calibrated image data 230 is the data that is sent to the color printing device 125.

The color correction transform 225 is adapted to transform from the color space associated with the bitmap image 215 to the color space associated with the calibrated image data 230. For the case where the bitmap image 215 is in a SWOP CMYK color space and the calibrated image data 230 is a C'M'Y'K' color space associated with a particular color printing device 125, the color correction transform 225 is used to account for any differences between the color of the standard SWOP colorants and the color of the actual colorants used in the color printing device 125. The color correction transform 225 is also used to account for other factors such as differences in the way the colorants interact to form combined colors.

The process of building a color correction transform 225 for use with the apply color correction transform step 220 generally involves building a device characterization transform (i.e., a mathematical model) that relates the colorant control values for the color printing device (e.g., C'M'Y'K' values) to corresponding device-independent color values in a device-independent color space such as the well known CIELAB color space (i.e., L*a*b*). Often the L*a*b* values are encoded using the well-known International Color Consortium Profile Connection Space (ICC PCS). The device characterization transform is generally built by printing a series of color patches having known colorant control values and then measuring the device-independent color values for the resulting printed color patches. A fitting process can then be used to build a mathematical model that can predict the device-independent color values as a function of the colorant control values.

In this example, the color correction transform 225 is built relative to the calibrated colorant control values (e.g., C'M'Y'K'). In this case, the color correction transform 225 is said to be in the calibrated device coordinate space of the printing device. In some embodiments, it may be desirable to build the color correction transform 225 so that it relates the native colorant control value (e.g., C"M"Y"K") to the device-independent color values rather than the calibrated colorant control values (e.g., C'M'Y'K'). In this case, the color correction transform 225 is said to be in the native device coordinate space of the printing device.

The color correction transform 225 can then be formed by determining the device-independent color values corresponding to the input color values (e.g., using a model for the system device color space such as SWOP CMYK-to-L*a*b* color profile), and then using the device characterization transform to determine the C'M'Y'K' colorant color values that will produce the corresponding color on the color printing device 125. For the case where the color correction transform 225 includes a multi-dimensional LUT, this process is repeated for each node in the LUT.

If the color printing device 125 uses more than three colorants (e.g., cyan, magenta, yellow and black), then there will generally be more than one combination of colorants (e.g., having different black levels) that will produce a particular device independent color. Various strategies can be employed to choose a particular colorant combination to use. For example, if the input color space is a CMYK color space (e.g., SWOP CMYK) and the color printing device 125 is a CMYK printer, one common strategy is to keep the amount of black ink the same (i.e., K'=K), and then to adjust the CMY colorant levels to produce the desired color. However, in other cases it may be necessary to adjust the amount of black ink that is printed to satisfy other criteria.

There may be some colors in the input image data 205 that have device-independent color values that are outside the color gamut on the color printing device 125 (i.e., the volume of colors that can be produced on the color printing device 125). In this case, it is necessary to apply a "gamut mapping" process to map these colors to modified color values that are on (or within) the color gamut.

Depending on the characteristics of the color printing system (e.g., printer type, print mode and print speed), the colorants (e.g., inks) and the receiver (e.g., paper), there is often a limit on the amount of colorant that can be printed on the page before artifacts are produced in the printed image. For example, the paper may start to buckle or curl, or the ink may start to coalesce on the surface of the paper forming a low frequency mottle pattern. As a result, color correction transforms 225 are often designed according to a limit on the Total Area Coverage (TAC) for the colorants. The TAC limit specifies the maximum total coverage of colorant that can be applied at a particular location (i.e., the sum of the coverages for each of the colorant channels).

In the graphic arts printing art, the TAC limit is typically expressed as a percentage of full coverage for a single colorant channel. For example, if the TAC limit is 250%, this would mean that the amount of ink printed at a particular location would be no more than 2.5× the full coverage amount for a single colorant channel. For example, the darkest black color might be produced using 100% coverage for the black ink and 50% coverage for the cyan, magenta and yellow inks In the inkjet printing art the TAC limit is sometimes expressed in terms of an ink volume per area (e.g., picoliters/mm$^2$ (pL/mm$^2$) or pL/pixel).

Conventional tools for building color correction transforms 225 typically include a user-adjustable parameter for specifying a TAC limit. The conventional transform building tools have generally been designed and tested to produce acceptable for modest TAC limits such as 250%-350%. However, in some printing configurations such as high speed continuous inkjet printing systems that print on low quality paper, it is necessary to impose TAC limits that may be on the order of 150%, or even lower. It has been found that the conventional color transform building tools do not generally produce good results under these conditions. The present invention relates to new methods that have been developed to build color correction transforms 225 that produce pleasing results when used for color printing devices having low TAC limits.

Figure 4:
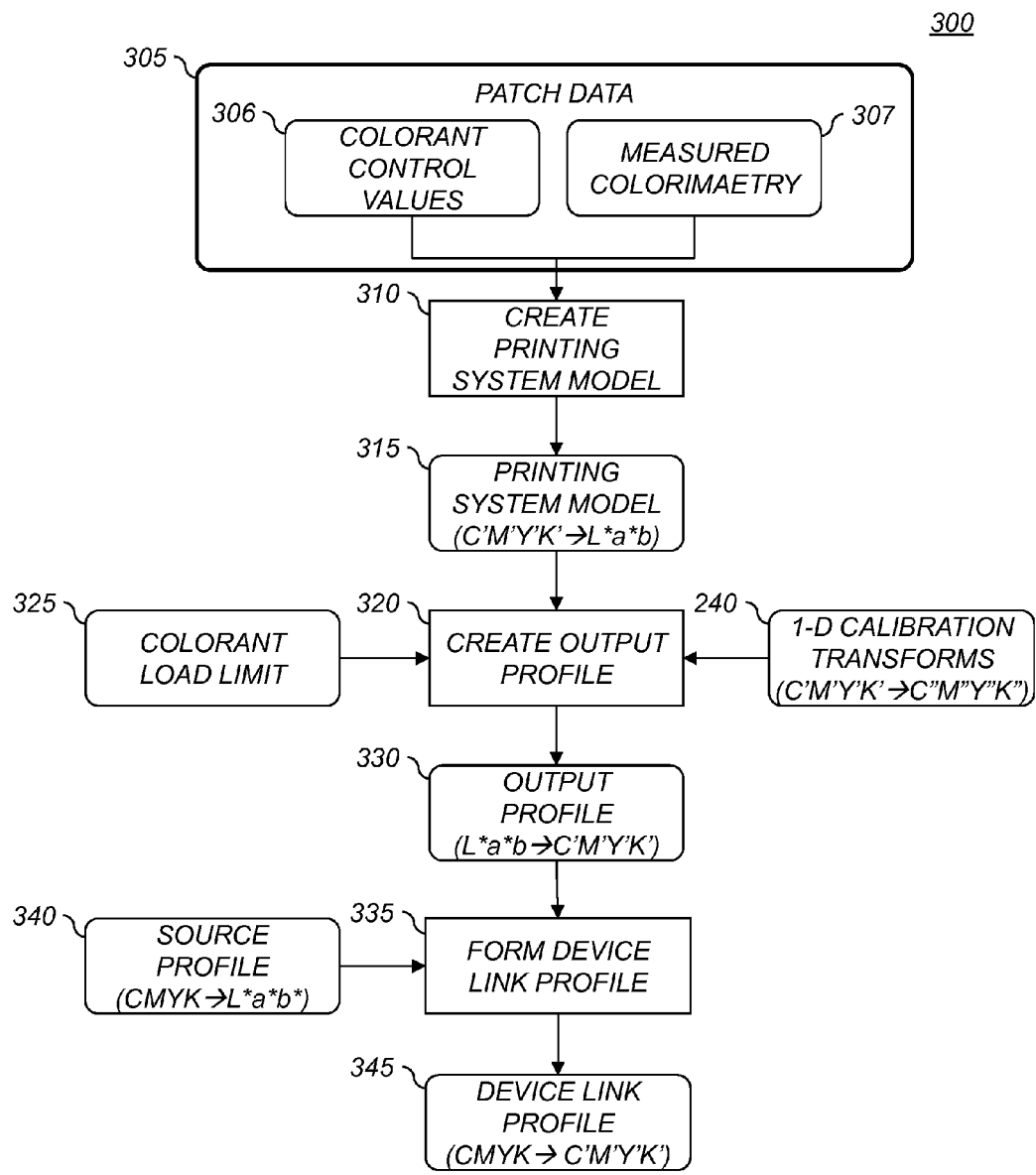
FIG. 4 is a functional block diagram of a method for creating an output profile and a device link profile for a color printing system in accordance with the present invention.

FIG. 4 is a functional block diagram of an exemplary implementation of a profile building process 300 for creating an output profile 330 and a device link profile 345 for a color printing device 125 (FIG. 2) for use within the color printing process 200 (FIG. 3) in accordance with the present invention. The various functional blocks of the profile building process 300 of FIG. 4 may be implemented in hardware, or may be implemented in software which is executed in a processor within data processing system 110 as mentioned above.

The output profile 330 produced by the profile building process 300 is preferably an ICC profile that includes a transform from the L*a*b*-based ICC profile connection space to the calibrated colorant control values (e.g., C'M'Y'K') of the color printing device 125. The output profile 330 can be used together with an ICC source profile for the input color space associated with the bitmap image 215 (e.g., SWOP CMYK) to provide the device link profile 345, which can be used for the color correction transform 225 (FIG. 2). As is well-known in the art, a device link profile can be pre-computed by combining a source profile 340 for the input color space with the output profile 330 for the color printing device. This device link profile 345 can then be used by the apply color correction transform step 220 to convert the image data from the input color space to calibrated colorant control values (e.g., from CMYK to C'M'Y'K'). In the special case where the source and destination profile represent the same printing system, the effect of the transform is to modify the relationship of CMY inks to the K ink or to modify the average total ink printed.

The input to the profile building process 200 is a set of patch data 305, which includes a set of colorant control values 306 (e.g., calibrated C'M'Y'K' device coordinates) and corresponding measured colorimetry 307 (e.g., L*a*b*) for a set of test patches. Upon receiving the data, a create printing system model step 310 is used to create a printing system model 315 that models the relationship between any set of color values C'M'Y'K' and measured L*a*b*. Methods for creating printing system models 315 are well-known in the art, and generally involve using a fitting process to form a multi-dimensional look-up table (LUT) that stores device-independent color values (e.g., $L^*a^*b^*$) for a lattice of device coordinates (e.g., C'M'Y'K').

A create output profile step 320 is used to create the output profile 330, which includes an inverse transform specifying the device coordinates (e.g., C'M'Y'K') that should be printed as a function of the device-independent color values ($L^*a^*b^*$). Generally, the output profile includes a 3-dimensional (3-D) LUT which stores the device coordinates for a lattice of device-independent color values. Inputs to the create output profile step 320 typically include a colorant load limit 325, as well as the 1-D calibration transforms 240 which indicate the relationship between the calibrated colorant control values (e.g., C'M'Y'K') and the native colorant control values (e.g., C"M"Y"K"). More details regarding the create output profile step 240 according to embodiments of the present invention will be discussed below with reference to FIG. 5.

A form device link profile step 335 is used to combine the source profile 340 for the input color space (e.g., CMYK) with the output profile 330, to form the device link profile 345, which can be used to transform input image data from the input color space directly to corresponding calibrated colorant control values (e.g., C'M'Y'K'). The form device link profile step 335 forms the device link profile 345 by converting a lattice of input code values (e.g., CMYK) through the source profile 340 (specifically using the A2B table) to determine corresponding device-independent color values (e.g., $L^*a^*b^*$), which are mapped to calibrated colorant control values (e.g., C'M'Y'K') using the output profile 330 (specifically using the B2A table). The resulting device link profile 345 can be stored in any useful format, such as an ICC device link profile. It should be noted that in various embodiments, the input color space of the source profile 340 (and consequently the device link profile 345) can be the device coordinate space of the printing system, the native device coordinate space of the printing device, or the device coordinate space of a different printing system.

Figure 5:
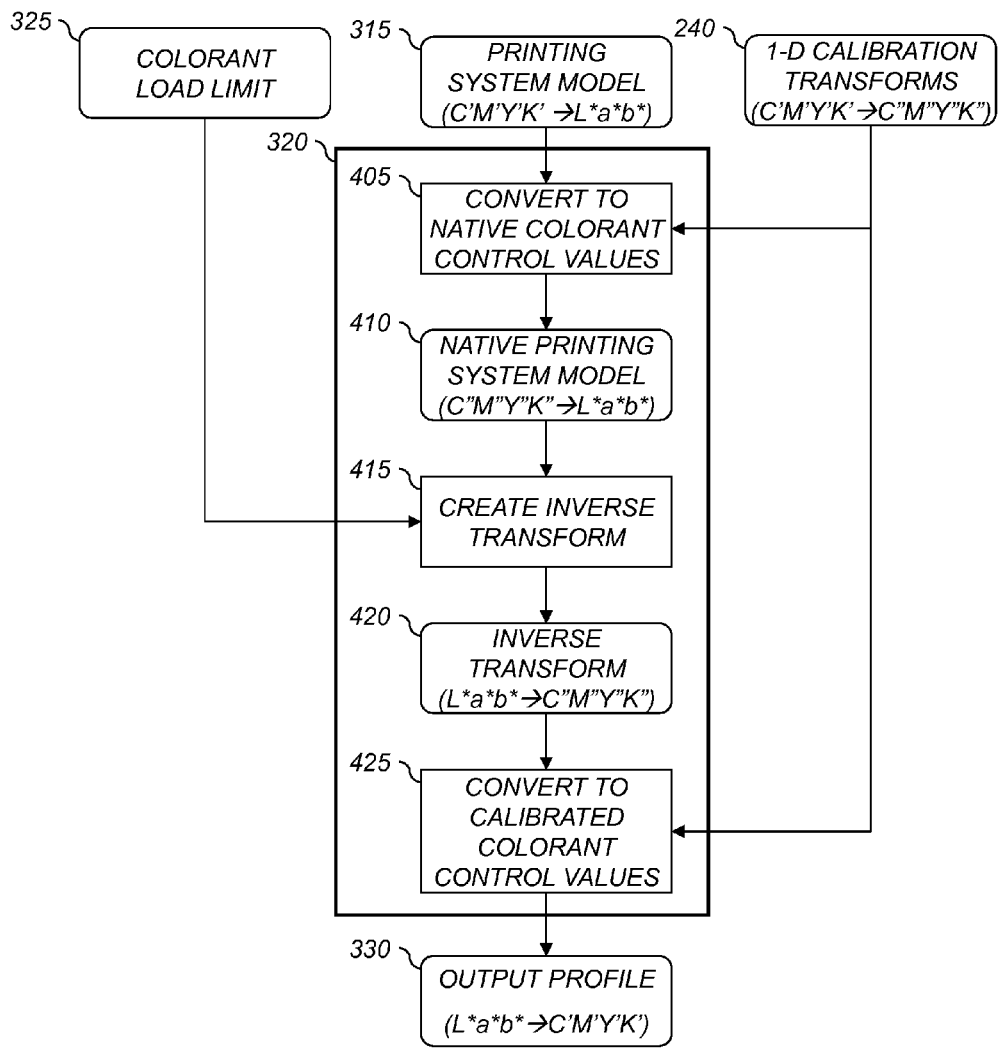
FIG. 5 is a functional block diagram showing additional details for the create output profile step of FIG. 4 in accordance with the present invention.

FIG. 5 shows a functional block diagram of an exemplary implementation of an output profile creation process 400 showing additional details of the create output profile step 320 according to a preferred embodiment. In the illustrated embodiment, the inputs to the create output profile step 320 include the printing system model 315, as well as the colorant load limit 325 and the 1-D calibration transforms 240. It will be understood that in some embodiments there may be other inputs including user-specified parameters.

In the preferred embodiment, a convert to native colorant control values step 405 is used to form a native printing system model 410 by using the 1-D calibration transforms 240 to modify the printing system model 315. The native printing system model 410 can be used to predict the device-independent color values (e.g., $L^*a^*b^*$) that will be produced by the color printing system as a function of the native colorant control values (e.g., C"M"Y"K"). The native colorant control values will generally have a direct relationship with the amount of colorant that is printed, and will therefore be a more appropriate color space for imposing limitations on the colorant load. This is consistent with the fact that ink limiting constraints such as total area coverage (TAC) or gray component removal (GCR) are historically defined relative to native device coordinates that are proportional to colorant amount (i.e., percent ink coverage) in traditional graphic arts printing systems.

Next, a create inverse transform step 415 is used to create an inverse transform 420, which defines the native colorant control values (e.g., C"M"Y"K") that should be printed as a function of the device independent color values (e.g., $L^*a^*b^*$). In the context of the present invention, an inverse transform 420 is meant to be a mathematical function or LUT that converts from device independent coordinates (e.g., $L^*a^*b^*$) to a colorant control value space (e.g., C'M'Y'K'). The create inverse transform step 415 includes imposing the colorant load limit 325. Additional details for the create inverse transform step 415 according to various embodiments of the invention will be discussed below relative to FIGS. 6A-6C.

A convert to calibrated colorant control values step 425 is used to convert the native colorant control values (e.g., C"M"Y"K") back to calibrated colorant control values (e.g., C'M'Y'K'). This is preferably done by applying a pre-calculated inverse transform of the 1-D calibration transforms 240 to the outputs of the inverse transform 420.

The output of the create output profile step 320 is an output profile 330, which is preferably a file in a useful profile format, the most common being an ICC profile. The inverse transform in an ICC profile is represented via B2A tables. Commonly the output profile 330 may include a plurality of different inverse transforms 420 corresponding to different rendering intents, such as relative or perceptual. In the case, the create inverse transform step 415 can be used to provide inverse transforms 420 for each of the rendering intents (either all at once or one at a time). Each of the inverse transforms 420 for the different rendering intents can then be stored as separate B2A tables for the different rendering intents.

Figure 6A:
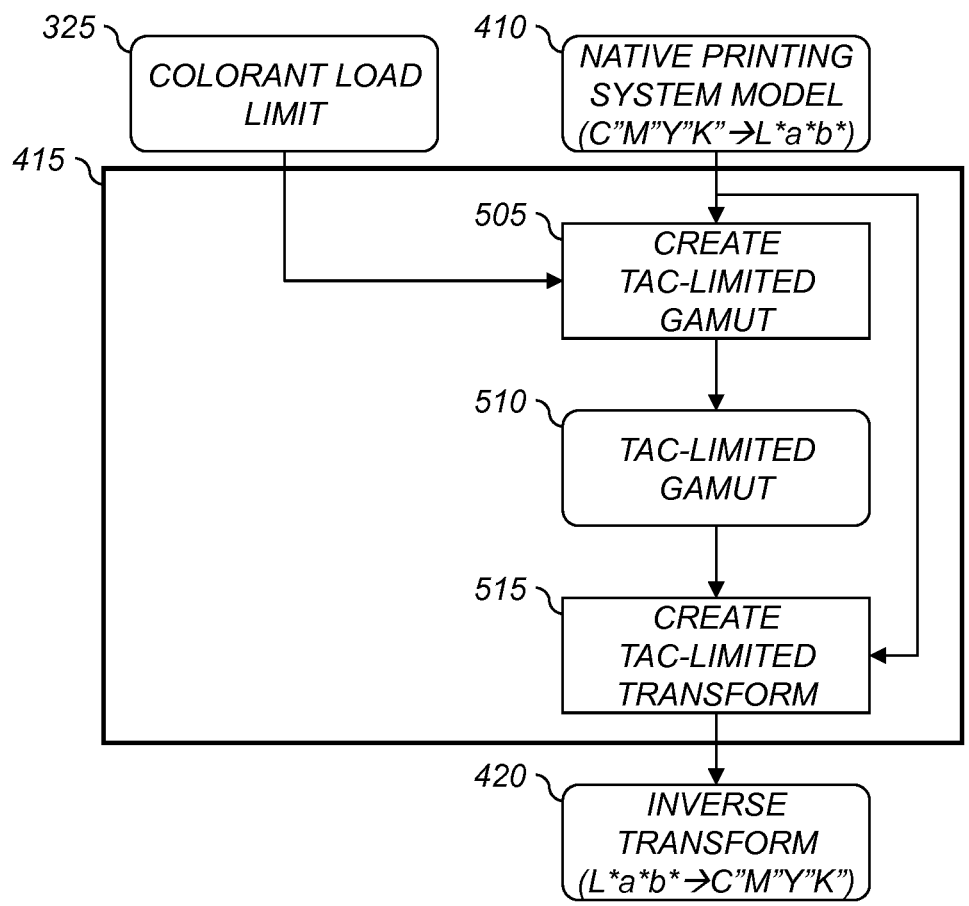
FIG. 6A is a functional block diagram showing additional details for the create inverse transform step of FIG. 5 according to one embodiment that includes applying a TAC limit to a native printing system model.

FIG. 6A shows additional details for the create inverse transform step 415 according to one embodiment. In this embodiment, the colorant load limit 325 is used as a conventional TAC limit, specifying a maximum total colorant load that can be printed for any given image pixel. Since the input color coordinates for the native printing system model 410 are the native colorant control values (e.g., C"M"Y"K"), they will be proportional to the amount of colorant that will be printed. A create TAC-limited gamut step 505 is used to determine a TAC-limited gamut 510 which contains only those colors that can be printed using a total colorant load that is less than or equal to the colorant load limit 325 (e.g., C"+M"+Y"+K"≦TAC limit). The TAC-limited gamut 510 can be determined by "cutting off" all native colorant control value combinations where the total colorant load is greater than the colorant load limit 325.

Determining the TAC-limited gamut 510 relative to the native printing system model 410 has the advantage that since it is computed relative to the native colorant control values, only those color values that actually exceed the physical TAC limit are excluded. In contrast, if the TAC limit were imposed relative to the printing system model 315 (FIG. 5) which is defined using calibrated colorant control values, there would not be a direct relationship between the sum of the colorant control values and the total colorant amount. Even more importantly, it has been found that for certain printing devices, applying the TAC limit in the native coordinate space of the printer can result in an improved shape of the TAC-limited gamut 510. This improvement in the gamut shape becomes more evident as TAC limit is lowered, and becomes important in achieving a good rendering of imagery.

Figure 7A:
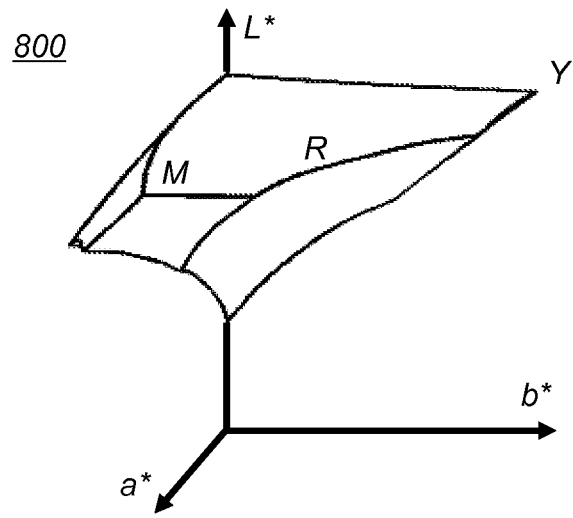
FIG. 7A shows a TAC-limited color gamut determined for a low TAC limit.

FIG. 7A shows an example of a TAC-limited gamut 800 formed using the create TAC-limited gamut step 505 (FIG. 6A) for the case where the colorant load limit 325 is set to a very low TAC limit (e.g., 150%). It can be seen that resulting color gamut has severe concavities where the colorant control value combinations exceeding the TAC limit have been cut away. For example, colors near the red corner of the color gamut (where yellow and magenta colorants are at their maximum levels) exceeded the TAC limit and were excluded from the TAC-limited gamut 800. Likewise, the colors between the primaries (C, M, Y) and secondaries (R=M+Y, G=C+Y, B=C+M) and the black point have also been exclude from the TAC-limited gamut 800 producing an excessive narrowing of the color gamut which is sometimes referred to as the "tornado effect." There is a clear loss of gamut volume in this region, resulting in printed colors that will appear desaturated. This also can result in a loss of local contrast in that region, producing undesirable color reproduction.

Returning to a discussion of FIG. 6A, once the TAC-limited gamut 510 has been created, it is used, together with the native printing system model 410, by a create TAC-limited transform step 515 to form the inverse transform 420. In a preferred embodiment, the create TAC-limited transform step 515 determines native colorant control values (e.g., C"M"Y"K") for a lattice of device-independent color values (e.g., L*a*b*). First, a gamut mapping step is used to map any device-independent color values outside of the TAC-limited gamut 510 to values that are on (or within) the surface of the TAC-limited gamut 510. The native printing system model 410 is then used to determine a corresponding set of native colorant control values (e.g., C"M"Y"K") that can be used to produce the gamut-mapped device-independent color values.

For color printing systems having four or more colorants, there will generally be a plurality of different colorant combinations that can be used to make a particular device-independent color value. Any method known in the art can be used to select a preferred colorant combination. Algorithms for selecting the preferred colorant combinations for CMYK color printing devices are sometimes referred to as "black strategies" since they involve selecting the amount of black colorant that should be used to produce a certain color. In some embodiments, the create TAC-limited transform step 515 includes various other operations such as black point compensation, which can be used to adjust the tone scale to map the black point of the TAC-limited gamut 510 to a perfect black point or to a very dark standard black point in device-independent color space. In some embodiments, if the input color space is a CMYK color space, the colorant combination using the equivalent amount of the black colorant can be selected, together with the amounts of cyan, magenta and yellow colorants that are necessary to produce the specified device-independent color value.

Figure 6B:
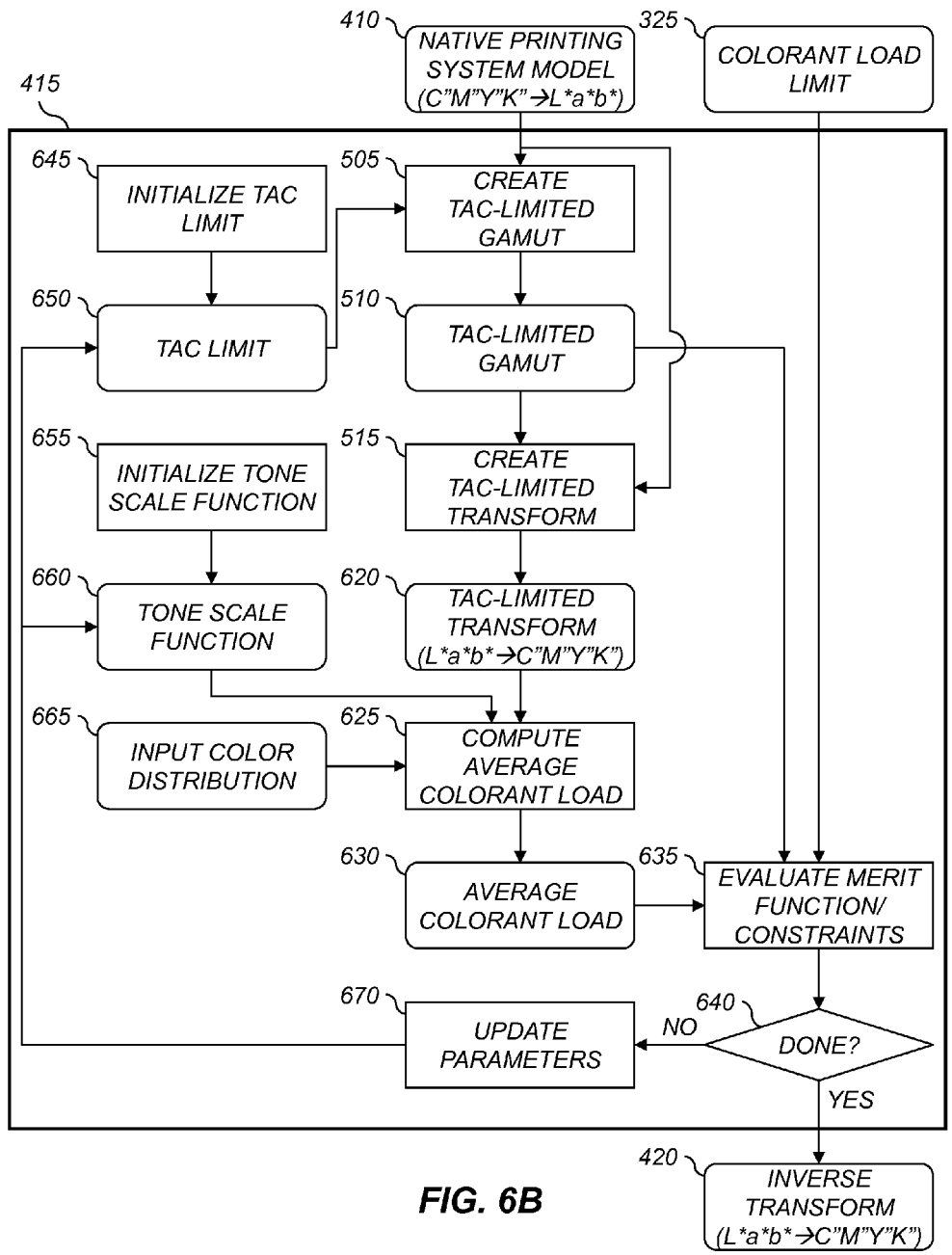
FIG. 6B is a functional block diagram showing additional details for the create inverse transform step of FIG. 5 according to a second embodiment that includes determining a TAC limit and a tone scale function to provide a merit function value.

FIG. 6B shows additional details for the create inverse transform step 415 according to a second embodiment. In this embodiment, the colorant load limit 325 is used as a constraint on the average colorant load, specifying a maximum average colorant load that can be printed given an input color distribution 665. This reflects the fact that often the factors that make it necessary to limit the colorant load are more a function of the average amount of colorant deposited across the printed image rather than the maximum colorant load that is produced for specific input color values. For example, wrinkle artifacts or smear artifacts can be produced on continuous inkjet printing systems if the average colorant load is too high even if no image artifacts are produced for local image regions having a high colorant load. In this case, the average colorant load limit will generally be a function of the type of receiver (e.g., paper) used in the color printing system. In other cases, the specification of the average colorant load constraint may be based on keeping the cost of the ink at an acceptable limit.

There are various ways that the average colorant load produced by a color printing system can be restricted. One way is to set a TAC limit 650 which is used to create the TAC-limited gamut 510. However, reducing the TAC limit 650 to an extremely low level can result in the TAC-limited gamut 510 having large concavities, which can have detrimental image quality effects as has been discussed earlier. Another way to reduce the average colorant load is to adjust the tone scale of input images that are to be printed so that they contain a higher average brightness. According to the embodiment of FIG. 6B, an improved tradeoff is determined between the TAC limit 650 and the shape of a tone scale function 660 that is used to modify the tone scale of the printed images. The improved tradeoff is determined by evaluating a merit function and applying a constraint on the average colorant load.

An initialize TAC limit step 645 is used to initialize the TAC limit 650 to a nominal value. In some embodiments, the initialize TAC limit step 645 sets the TAC limit 650 to a predefined low level which is sufficient to satisfy the average colorant load constraint if an identify tone scale function 660 is used. In other embodiments, it can be set to some other value such as a predefined high level that does not produce any objectionable concavities.

An initialize tone scale function step 655 is used to initialize the tone scale function 660. The tone scale function 660 is preferentially defined using a parametric formula having one or more tone scale adjustment parameters. For example, the tone scale adjustment parameters can include a brightness parameter and a contrast parameter.

In a preferred embodiment, the tone scale function 660 is used to modify the L* values of the image to be printed. In some implementations, a brightness parameter can be used to adjust the L* at $L^*_{mid}=(L^*_{max}+L^*_{min})/2$ with no change at the max or min value of L*. An example of a brightness adjustment function to achieve a brightness adjustment would be a 3 point spline having control points at $L^*_{min}$, $L^*_{mid}$ and $L^*_{max}$, where the control points at $L^*_{min}$ and $L^*_{max}$ do not change from their original values and the control point at $L^*_{mid}$ is adjusted. Similarly, in some implementations, a contrast parameter can be used to adjust the mid-tone slope of the tone scale function 660. For example, the contrast can be increased by increasing the L* at $L^*_H=2(L^*_{max}+L^*_{min})/3$ and decreasing the L* at $L^*_L=(L^*_{max}+L^*_{min})/3$. An example of a contrast adjustment function to achieve a contrast adjustment would be a 4 point spline having control points at $L^*_{min}$, $L^*_L$, $L^*_H$ and $L^*_{max}$, where the control points at $L^*_{min}$ and $L^*_{max}$ do not change from their original values and the control points at $L^*_L$ and $L^*_H$ are adjusted by increasing one according to the contrast parameter and decreasing the other by a corresponding increment. The tone scale function 660 can then be determined by cascading the brightness adjustment function and the contrast adjustment function.

In some embodiments, the tone scale function 660 can be used to adjust more than just the lightness (L*) values of the image. For example, the chroma (C*) of the colors can also be modified responsive to the tone scale function parameters (e.g., the chroma can be adjusted so that the color saturation is preserved by the L* modification, where saturation is defined to be the ration of the chroma to the lightness.)

As has been discussed before, the create TAC-limited gamut step 505 is used to form the TAC-limited gamut 510 using the TAC limit 650. The create TAC-limited transform step 515 is then used to determine a TAC-limited transform 620 which only uses colorant control values that are inside the TAC-limited gamut 510.

A compute average colorant load step 625 is used to determine an average colorant load 630 for the input color distribution 665 given the TAC-limited transform 620 and the tone scale function 660. The input color distribution 665 preferably corresponds to the distribution of input colors that are contained in a set of typical input images that will be printed using the color printing system. In some cases, the input color distribution 665 can correspond to the distribution of input colors in a specific set of input images that the color transform will be used to print.

An evaluate merit function/constraints step 635 is used to evaluate the desirability of the solution provided using the TAC limit 650 and the tone scale function 660. In a preferred embodiment, the merit function includes a tone scale reproduction accuracy term which is responsive to the tone scale adjustment function and a gamut shape term which is responsive to a color gamut shape. The merit function provides an estimate of the image quality that will be result from the tone scale function 660 and the TAC limit 650.

In a preferred embodiment, the tone scale accuracy term represents a difference between the tone scale function 660 and an identity function. The following equation gives one example of a tone scale accuracy term $Q_t$ where lightness differences are evaluated for a set of N equally spaced test points:

$$Q_t = \sqrt{\frac{1}{N}\sum_{i=1}^{N}(L^*_{i,out} - L^*_{i,in})^2} \quad (1)$$

where $L^*_{i,in}$ and $L^*_{i,out}$ are the input lightness and the corresponding output lightness for the $i^{th}$ test point, respectively. (The output lightness is determined by mapping the input lightness through the tone scale function 660.) It can be seen that the effect of Eq. (1) is to compute the RMS $\Delta L^*$ value relative to an identity function for a set of uniformly spaced lightness values.

Alternately, the tone scale accuracy term can be determined based on a difference between the tone scale function 660 and a nominal tone scale function determined to correspond to a preferred tone reproduction setting.

In some embodiments, the tone scale accuracy term can be determined based on lightness differences ($\Delta L^*$) or color differences ($\Delta E^*$) for a set of colors selected from a set of representative images.

In some embodiments, the tone scale accuracy term can be determined by using a soft-copy display to present a preview of one or more images that have been processed through the tone scale function 660 to a user, or by printing the processed images. The user can then visually evaluate the processed images and can enter a feedback value via a graphical user interface (GUI), wherein the feedback value provides an indication of the quality of the tone reproduction.

In a preferred embodiment, the gamut shape term is computed based on the difference between the shapes of the TAC-limited gamut 510 and a reference color gamut. In one embodiment, the reference color gamut is a convex color gamut determined by fitting a convex hull around the TAC-limited gamut 510. (The use of the convex color gamut as the reference color gamut provides a convenient way to characterize the concavity of the TAC-limited gamut 510.)

In other embodiments, different color gamuts can be used for the reference color gamut. For example, the reference color gamut can be a nominal color gamut determined from the native printing system model 410 without imposing the TAC limit 650. Alternately, the reference color gamut can be an idealized color gamut having corner points defined by the color primaries and secondaries corresponding to the native printing system model 410. The idealized color gamut can then be defined by forming a triangular tessellation of the corner points together with idealized white and black points.

One way to measure the difference between the shape of the TAC-limited gamut 510 and the reference color gamut is compute a ratio of the volume of the TAC-limited gamut 510 to the volume of the reference color gamut:

$$Q_s = V_{TAC}/V_r \quad (2)$$

where $V_{TAC}$ is the volume of the TAC-limited gamut 510, $V_r$ is the volume of the reference color gamut, and $Q_s$ is the gamut shape term.

Another way to measure the difference between the shape of the TAC-limited gamut 510 and the reference color gamut is compute is to compute $\Delta E^*$ values between a set of points on the surface of the TAC-limited gamut 510 and a corresponding set of points on the surface of the reference color gamut. The distribution of the $\Delta E^*$ values can then be analyzed to determine a measure of the difference. For example, the average or maximum $\Delta E^*$ value can be computed.

In some embodiments, the gamut shape term can be determined responsive to a measure of the surface concavity determined for one or more surfaces of the TAC-limited gamut 510. For example, the surface concavity can be characterized for a set of points on the TAC-limited gamut 510 by computing numerical derivatives. The gamut shape term can then be determined by evaluating the distribution of surface concavity values. For example, the largest surface concavity value or the average surface concavity value can be determined. As noted earlier, the difference between the volume of the TAC-limited gamut 510 and the volume of the corresponding convex hull can also be used as a measure of surface concavity.

In some embodiments, the gamut shape term can be determined by displaying a graphical representation of the TAC-limited gamut 510 to a user by means of a graphical user interface (GUI). The user can then visually evaluate the characteristics of the TAC-limited gamut 510 and can enter a feedback value providing an indication of the quality of the gamut shape.

In some embodiments, the merit function can have additional terms characterizing other attributes pertaining to the quality of the TAC-limited gamut 510. For example, larger TAC-limited gamuts 510 are generally preferred to smaller TAC-limited gamuts 510. Therefore, a gamut volume term, $Q_v$, can be defined such as:

$$Q_v = V_{TAC} \quad (3)$$

The merit function can then combine the various terms by computing a weighted combination:

$$Q = a_t Q_t + a_s Q_s + a_v Q_v \quad (4)$$

where $a_t$ is a weighting value for the tone scale accuracy term, $a_s$ is a weighting value for the gamut shape term, $a_v$ is a weighting value for the gamut volume term, and Q is the merit function value.

In addition to evaluating the merit function, the evaluate merit function/constraints step 635 also evaluates any constraints that are imposed on the optimization process. In a preferred embodiment, a constraint is applied that the average colorant load 630 must be less than the colorant load limit 325. If the specified TAC limit 650 and tone scale function 660 do not satisfy this constraint, the solution is rejected as being unacceptable.

A done test 640 is used to determine whether the optimization process should be terminated. If the solution does not satisfy the average colorant load constraint, or if the merit function value has not converged, an update parameters step 670 is used to update the TAC limit 650 and the parameters of the tone scale function 660. The update parameters step 670 can determine the updated parameters using any method known to those skilled in the nonlinear function optimization art. In a preferred embodiment, the optimum parameter values are determined using a steepest-descent optimization technique in which the updated parameter values are determined responsive to an estimate of the local gradient of the merit function. This allows the optimization process to incrementally move toward the parameter values corresponding to the local extrema of the merit function.

The done test 640 can determine whether the optimization loop should be terminated by determining when the merit function value/parameter values have converged and are no longer changing, or when a maximum number of iterations has been reached. When the done test 640 determines that the optimization process is done, the final TAC-limited transform 620 is designated to be the inverse transform 420. The final tone scale function 660 is also designated to be used to process input images that are to be printed on the color printing device.

In some embodiments, the tone scale function 660 can be incorporated into the inverse transform 420 by combining the tone scale function 660 with the TAC-limited transform 620 such that it is not necessary to process input images through an additional tone scale transform. For example, if the tone scale function 660 is an L* modification function, an effects transform embodying the L* modification function can be cascaded with the TAC-limited transform 620 to form the inverse transform 420. Alternately, the tone scale function 660 can be combined with the source profile 340 and the output profile 330 during the formation of the device link profile 345 (FIG. 4).

Figure 6C:
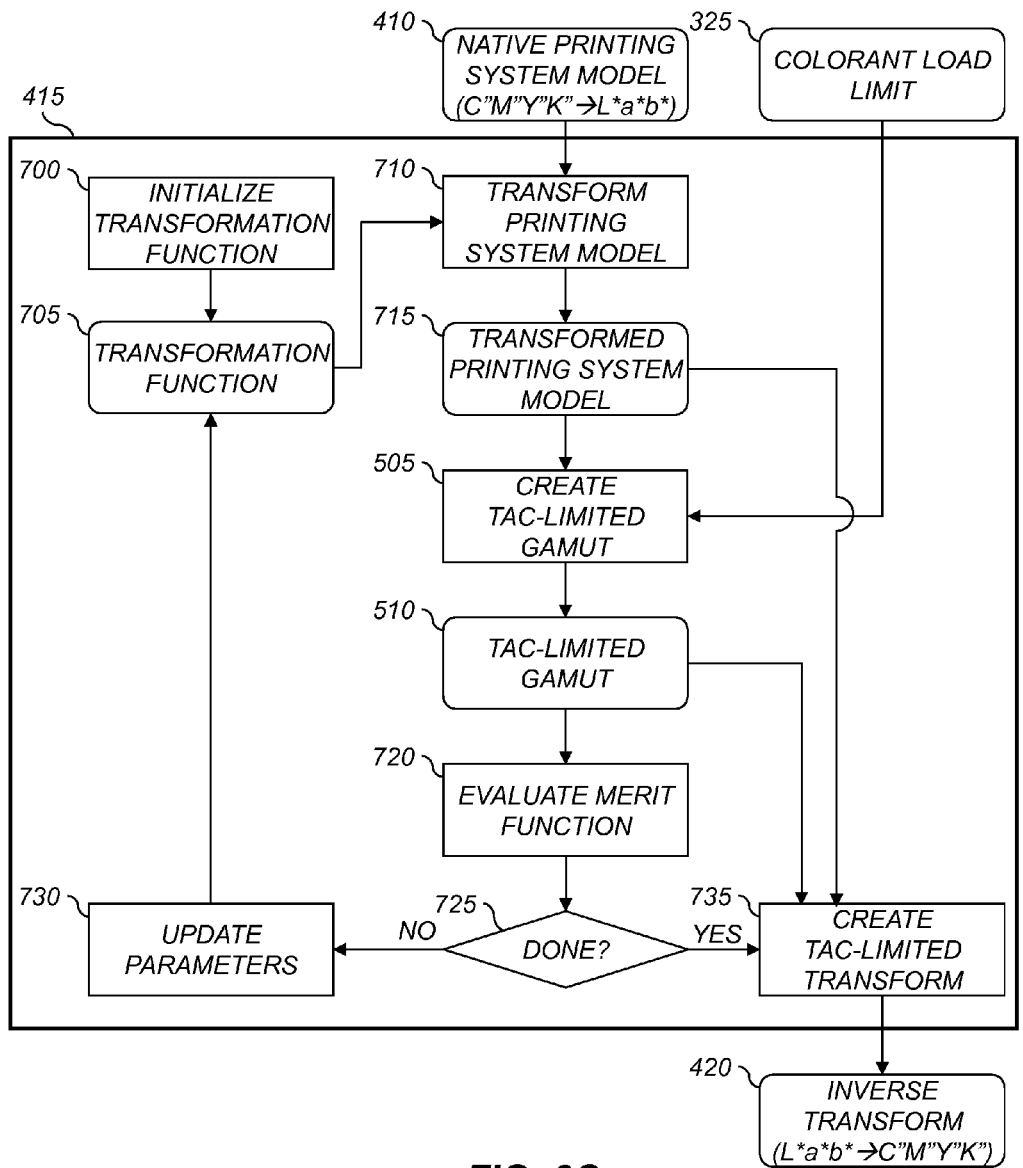
FIG. 6C is a functional block diagram showing additional details for the create inverse transform step of FIG. 5 according to a third embodiment that includes determining a transformation function to provide a merit function value.

FIG. 6C shows additional details for the create inverse transform step 415 according to a third embodiment. In this embodiment, the colorant load limit 325 is used as a TAC limit as in the embodiment of FIG. 6A, specifying a maximum total colorant load that can be printed for any input color.

Figure 8:
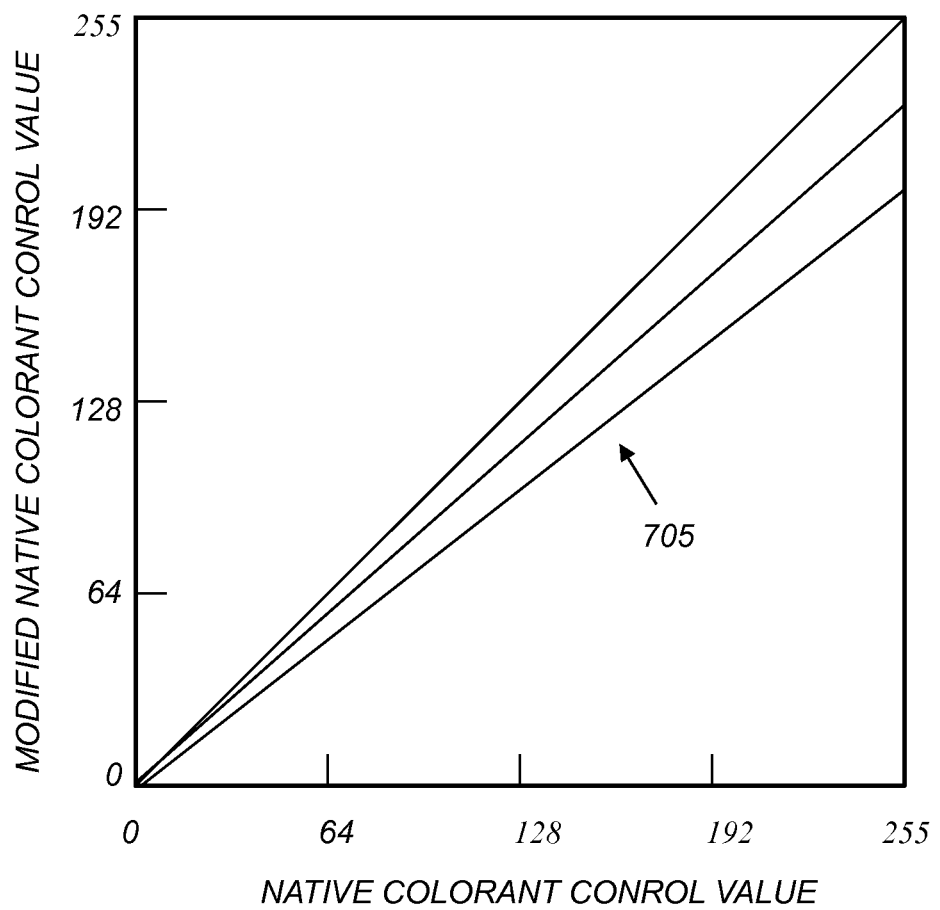
FIG. 8 illustrates a family of transformation functions providing different maximum colorant control values.

As discussed earlier, the imposition of a very low TAC limit can result in severely concave TAC-limited gamuts as shown in FIG. 7A, which can result in objectionable image artifacts. In order to avoid these artifacts, the embodiment shown in FIG. 6C uses a transformation function 705 to transform the native printing system model 410. In some embodiments, the transformation function 705 limits the maximum native colorant control values (e.g., C"M"Y"K") that are used to print input images. For example, FIG. 8 shows plots of a series of transformation functions 705 where the native colorant control values are modified using scale factors to impose a series of maximum native colorant control value. In this case, a single scale factor parameter can be used to specify the shape of the transformation function 705.

In some embodiments, the transformation functions 705 may be controlled using a plurality of transformation function parameters. For example, a scale factor parameter can be used to adjust the maximum native colorant control value and a second shape parameter can be used to adjust the shape of the transformation function. In some embodiments, the transformation function 705 can be defined as using a spline function having a series of spline knots characterized by one or more parameters which can be individually adjusted. In some embodiments, the transformation function 705 can be defined using a 1-D LUT, and each entry in the LUT can be viewed as an independent transformation function parameter.

Returning to a discussion of FIG. 6C, an initialize transformation function step 700 is used to initialize the one or more transformation function parameters that control the transformation function 705 to nominal values. In some embodiments, the initialize transformation function step 700 initializes the values of the transformation function parameters so that the initial transformation function 705 is an identity function. In other cases, historical data can be used to determine reasonable initial transformation function parameter values.

A transform printing system model step 710 is used to transform the native colorant control values (e.g., C"M"Y"K") of the native printing system model 410 using the transformation function 705, thereby providing a transformed printing system model 715. In a preferred embodiment, this is accomplished by cascading the transformation function with the native printing system model 410. For the case where the transformation function 705 has the form shown in FIG. 8, this will have the effect of limiting the maximum accessible native colorant control value, which will have the effect of reducing the size of the system color gamut as the primary and secondary colors are pulled back toward the white point.

In some embodiments, the same transformation function 705 is applied to each of the colorant channels of the native printing system model. In other embodiments, a set of transformation functions 705 can be used, one for each colorant channel, so that they can be independently adjusted.

As in FIG. 6A, a create TAC-limited gamut step 505 is used to determine a TAC-limited gamut 510 responsive to the TAC limit given by the colorant load limit 325. Note that the TAC limit will generally be specified relative to native colorant control values, therefore it will be necessary to account for the shape of the transformation function 705 during the imposition of the TAC limit. As the maximum native colorant control value is reduces, the create TAC-limited gamut step 505 will need to carve out smaller portions for the reduced color gamut. This will result in smaller concavities in the TAC-limited gamut 510, and will therefore produce fewer image artifacts.

An evaluate merit function step 720 is used to evaluate a merit function which characterizes the quality of the TAC-limited gamut 510. In a preferred embodiment, the merit function includes a gamut shape term which is responsive to the shape of the TAC-limited gamut 510. For example, the gamut shape term can be computed based on the difference between the shapes of the TAC-limited gamut 510 and a reference color gamut. The various gamut shape terms discussed with respect to FIG. 6B are equally applicable here.

In some embodiments, the merit function can have additional terms characterizing other attributes pertaining to the quality of the TAC-limited gamut 510. For example, a gamut volume term such as that given in Eq. (3) can be used to reflect the fact that larger color gamuts are typically preferable.

The merit function can then combine the various terms by computing a weighted combination:

$$Q = a_s Q_s + a_v Q_v \qquad (5)$$

where $a_s$ is a weighting value for the gamut shape term, $a_v$ is a weighting value for the gamut volume term, and Q is the merit function value.

A done test 725 is used to determine whether the optimization process should be terminated. If the merit function value has not converged, an update parameters step 730 is used to update the parameters of the transformation function 705. The update parameters step 730 can determine the updated parameters using any method known to those skilled in the nonlinear function optimization art. In a preferred embodiment, the optimum parameter values are determined using a steepest-descent optimization technique in which the updated parameter values are determined responsive to an estimate of the local gradient of the merit function. This allows the optimization process to incrementally move toward the parameter values corresponding to the extrema (e.g., the maxima) of the merit function. In some embodiments, a GUI can be provided to enable a user to manually specify updated parameter values.

For cases where the transformation function 705 is specified with a single maximum colorant control value parameter, the update parameters step 730 can reduce the maximum colorant control value parameter by a predefined increment for each iteration until the done test 725 determines that the merit function value has reached a predefined threshold (e.g., a merit function value that is known to correspond to an acceptable gamut shape).

The done test 725 can determine whether the optimization loop should be terminated by determining when the merit function value/parameter values have converged and are no longer changing, or when a maximum number of iterations has been reached. When the done test 725 determines that the optimization process is done, a create TAC-limited transform step 735 is used to determine the inverse transform 420 responsive to the transformed printing system model 715 and the TAC-limited gamut 510.

In some embodiments, the create TAC-limited transform step 735 also accounts for the transformation function 705 so that the output of the inverse transformation is in the form of native colorant control values (e.g., C"M"Y"K"). In this way, the output profile 330 (FIG. 5) determined using the output profile creation process 400 (FIG. 5) will incorporate the effects of the transformation function 705. In other embodiments, the transformation function 705 can be incorporated into the 1-D calibration transforms 240 (FIG. 3).

In some embodiments, the methods for determining the inverse transform 420 described relative to FIGS. 6B and 6C can be combined. For example, the method of FIG. 6B can be extended by applying the transformation function 705 to the native printing system model 410 as in FIG. 6C. The update parameters step 670 can then adjust the parameters for the transformation function 705 in addition to adjusting the TAC limit 650 and the parameters for the tone scale function 660. Similarly, the method of FIG. 6C can be extended by including an adjustable TAC limit 650 and an adjustable tone scale function 655 as in FIG. 6B, and by using the colorant load limit 325 to impose a constraint on the average colorant load.

In some embodiments, the methods of FIGS. 6B and 6C can be applied sequentially. For example, the method of FIG. 6B can be used to determine an optimized TAC limit 650 and tone scale function 660, then the method of FIG. 6C can be used to determine an optimized transformation function 705. In some embodiments, this optimization sequence can then be performed iteratively so that a new optimized TAC limit 650 and tone scale function 660 are then determined using the optimized transformation function 705, and so forth, until the optimization process converges.

Figure 7B:
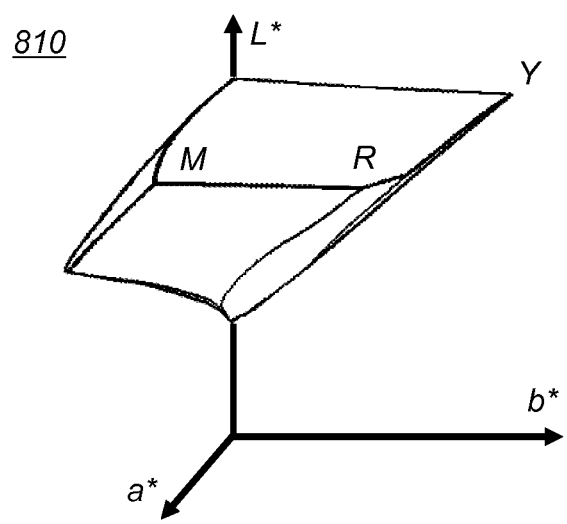
FIG. 7B shows a TAC-limited color gamut determined in accordance with the present invention.

FIG. 7B shows an example of a colorant-limited gamut 810 where a transformation function 705 (FIG. 6C) has been used to reduce the maximum colorant control value relative to the example shown in FIG. 7A. This enables a higher TAC limit 650 (FIG. 6B) to be used while still satisfying the average colorant load constraint. It can be seen that the shape of the resulting colorant-limited gamut 810 is much better behaved than that of the TAC-limited gamut 800 in FIG. 7A. With the colorant-limited gamut 810, the progression from saturated colors to the black point is fairly linear, whereas the same progression in FIG. 7A is very non-linear in a concave direction, thereby greatly reducing the gamut volume and therefore the saturation of colors in this region. While the chroma of the saturated primaries in the colorant-limited gamut 810 has been reduced somewhat relative to the TAC-limited gamut 800, the severe concavities associated with the TAC-limited gamut 800 have been almost entirely eliminated. The result will be printed images with substantially reduced printing artifacts.

The methods described with respect to FIGS. 6B and 6C are most useful for systems which require very low TAC limits (e.g., less than 200%). If the TAC limit is greater than or equal to 200%, it is possible to print the secondary colors (i.e., red, green and blue) using full amounts of the appropriate cyan, magenta and yellow colorants. As a result, no concavities will be induced on the upper gamut surface by the TAC-limiting process. For systems which do not require such low TAC limits, acceptable results can often be achieved using the simpler method shown in FIG. 6A. Therefore, it may be desirable to select an appropriate version of the create inverse transform step based on the require TAC limit.

The optimization processes discussed with reference to FIGS. 6B and 6C are designed to produce three desired outcomes: good visual appearance with regards to brightness and contrast, good color reproduction between regions of dark or saturated colors, and low average ink load.

The first desired outcome of good visual appearance may be somewhat preferential according to the user or application because it relates to perceptual rendering. Perceptual rendering attempts to map images associated with a source imaging system to a destination system with less dynamic range than the source, either in saturation, contrast, or both. The goal of perceptual rendering is to preserve the appearance as nearly as possible, utilizing color appearance models and gamut mapping methods. It may be desirable to provide user adjustable settings that allow the user to specify preferred tone scale adjustments according to their rendering preferences. The adjustments to the tone scale function 660 (FIG. 6B) are intended to preserve the preferred visual appearance as much as possible.

The second desired outcome of good color reproduction between regions of dark or saturated colors is more quantifiable. The general rule for good color reproduction is to avoid concavities between vertices, either between vertices of solid single and dual ink colors or between the gamut girdle and the black point of the system. The presence and magnitude of concavities can be quantified using the earlier described gamut shape merit function terms, or can be assessed visually via a 3-D gamut plot.

The third desired outcome of low average ink load can be quantified by calculating the average colorant load for the input color distribution 665. A constraint can be placed on the average colorant load that can be imposed during the optimization process. Alternately, a term can be added to the merit function that preferentially encourages lower average colorant loads.

Figure 9:
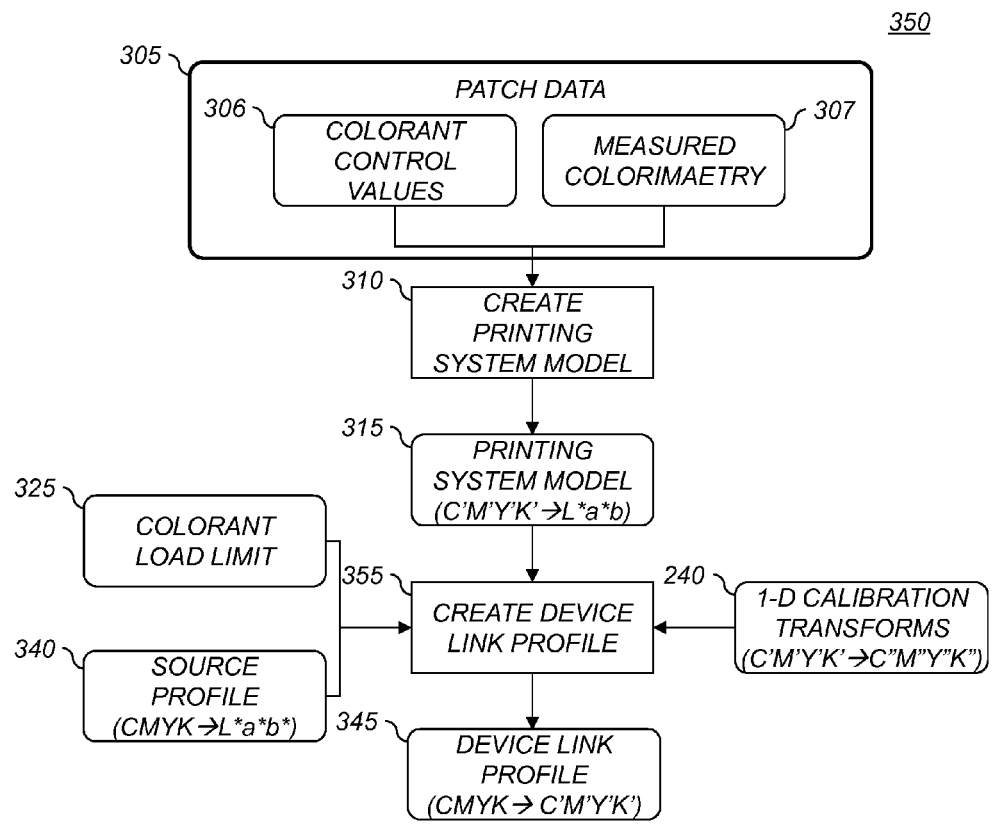
FIG. 9 is a functional block diagram of a method for creating a device link profile for a color printing system in accordance with the present invention.

FIG. 9 shows a functional block diagram for an exemplary implementation of a device link profile building process 350 for directly creating a device link profile 345 for a color printing device 125 (FIG. 2) for use within the color printing process 200 (FIG. 3) in accordance with the present invention. Most of the steps in the device link profile building process 350 of FIG. 9 are identical to those of the profile building process 300 described with reference to FIG. 4. The only difference is that a create device link profile step 355 is used in place of the create output profile step 320 and the form device link profile step 335.

As was discussed with reference to FIG. 4, device link profiles 345 can be constructed by combining a source profile 340 and an output profile 330. However, the device link profile 345 can optionally be created by directly utilizing the printing system model 315 rather than the output profile 330. This permits, for example, the mapping of K to K' with the constraint that if C=M=Y=0 for input, C'=M'=Y'=0 for output.

The create device link profile step 355 forms the device link profile 345 by determining the calibrated colorant control values (e.g., C'M'Y'K') that should be used as a function of input code values (e.g., CMYK). In some embodiments, the source profile 340 is used to determine device-independent color values (e.g., L*a*b*) for a particular set of input code values. Various constraints are then applied as appropriate (e.g., setting K'=K and performing gamut mapping to the TAC-limited gamut 510) and the printing system model 315 is used to determine the remaining calibrated colorant control values (e.g., C', M' and Y') in order to produce the desired device-independent color values. It will be obvious to one skilled in the art that all of the features of the present invention that were discussed with reference to FIG. 5 and FIGS. 6A-6C can also be applied to the create device link profile step 355. Additional discussion regarding directly forming device link profiles 345 that can be useful in understanding the present invention is described in U.S. Pat. No. 7,057,765 entitled "Constrained multi-dimensional color transformation," which is included herein by reference.

Many aspects of the invention have been described as being at least partially implemented in software. Alternatively, exemplary hardware implementations may include implementations within a DSP, an application specific integrated circuit (ASIC), a field programmable gate array (FPGA), a programmable logic device, specifically designed hardware components, or any combination thereof.

Although many aspects of the invention have been described in the context of a method for reducing ink in a CMYK printing system, aspects of the invention may be readily applicable to calibration of other printing systems, including systems that print CMYK and spot color inks, systems that utilize multiple shades or densities of each ink which are combined to form one ink channel in response to an input ink channel value, systems that are primarily halftone in property, systems that are primarily continuous tone in property, as well as hybrid systems with properties of both halftone and continuous tone. Accordingly, other implementations and embodiments are within the scope of the following claims.

PARTS LIST 100 full color gamut
105 TAC-limited color gamut
110 data processing system
120 peripheral system
125 color printing device
130 user interface system
140 data storage system
200 color printing process
205 input image data
210 RIP image data step
215 bitmap image
220 apply color correction transform step
225 color correction transform
230 calibrated image data
235 apply calibration transform step
240 1-D calibration transforms
245 native image data
250 print image data step
300 profile building process
305 patch data
306 colorant control values
307 measured colorimetry
310 create printing system model step
315 printing system model
320 create output profile step
325 colorant load limit
330 output profile
335 form device link profile step
340 source profile
345 device link profile
350 device link profile building process
355 create device link profile
400 output profile creation process
405 convert to native colorant control values step
410 native printing system model
415 create inverse transform step
420 inverse transform
425 convert to calibrated colorant control values step
505 create TAC-limited gamut step
510 TAC-limited gamut
515 create TAC-limited transform step
620 TAC-limited transform
625 compute average colorant load step
630 average colorant load
635 evaluate merit function/constraints step
640 done test
645 initialize TAC limit step
650 TAC limit
655 initialize tone scale function step
660 tone scale function
665 input color distribution
670 update parameters step
700 initialize transformation function step
705 transformation function
710 transform printing model step
715 transformed printing system model
720 evaluate merit function
725 done test
730 update parameters step
735 create TAC-limited transform step
800 TAC-limited gamut
810 colorant-limited gamut

The invention claimed is:

1. A method for forming a color transform for a color printing device having a plurality of colorant channels, each having an associated colorant control value, comprising:

determining a device characterization transform that relates colorant control values to device-independent color values;

defining a tone scale adjustment function having one or more tone scale adjustment parameters;

defining a merit function including a tone scale reproduction accuracy term which is responsive to the tone scale adjustment function and a gamut shape term which is responsive to a color gamut shape;

defining an initial total colorant load limit;

determining an initial color gamut shape responsive to the device characterization transform and the initial total colorant load limit;

determining an initial merit function value corresponding to an initial set of tone scale adjustment parameters and the initial total colorant load limit;

using a data processor to determine modified set of tone scale adjustment parameters and a modified total colorant load limit that provides an improved merit function value relative to the initial merit function value, wherein the improved merit function value is determined responsive to a modified tone scale adjustment function corresponding to the modified set of tone scale adjustment parameters and a modified color gamut shape corresponding to the modified total colorant load limit; and determining a color transform for transforming input color values for an input digital image to colorant control values for the color printing device responsive to the modified set of tone scale adjustment parameters and the modified total colorant load limit;

wherein the modified set of tone scale adjustment parameters and the modified total colorant load limit are determined subject to a constraint that an average total colorant load is no more than a predefined threshold for a set of printed colors produced by applying the color transform to a predefined distribution of input colors.

2. The method of claim 1 wherein the modified set of tone scale adjustment parameters and the modified total colorant load limit are determined to optimize the merit function.

3. The method of claim 1 wherein the tone scale adjustment function specifies adjustments to device-independent color values for the input color values.

4. The method of claim 3 wherein the tone scale adjustment function specifies adjustments to a device-independent lightness value.

5. The method of claim 1 wherein the tone scale adjustment parameters control a brightness or a contrast of the tone scale adjustment function.

6. The method of claim 1 wherein the initial set of tone scale adjustment parameters correspond to an initial tone scale adjustment function which is an identity function.

7. The method of claim 1 wherein the tone scale reproduction accuracy term is responsive to a difference between and identity function and the modified tone scale adjustment function.

8. The method of claim 1 wherein the tone scale reproduction accuracy term is responsive to a difference between a nominal tone scale adjustment function and the modified tone scale adjustment function.

9. The method of claim 1 wherein the gamut shape term is responsive to a difference between the modified color gamut shape and a reference color gamut shape.

10. The method of claim 9 wherein the reference color gamut shape is a convex hull determined from the modified color gamut shape.

11. The method of claim 9 wherein the reference color gamut shape is a nominal color gamut determined from the device characterization transform without imposing the total colorant load limit.

12. The method of claim 9 wherein the reference color gamut shape is an idealized color gamut shape having color primaries and secondaries corresponding to the device characterization transform.

13. The method of claim 9 wherein the difference between the modified color gamut shape and the reference color gamut shape is determined based on a difference between a volume of the modified color gamut shape and a volume of the reference color gamut shape.

14. The method of claim 13 wherein the difference between the volume of the modified color gamut shape and the volume of the reference color gamut shape is characterized by a ratio of the volume of the modified color gamut shape to the volume of the reference color gamut shape.

15. The method of claim 1 wherein the gamut shape term is responsive to a surface concavity determined for one or more surfaces of the modified color gamut shape.

16. The method of claim 1 wherein the merit function also includes a gamut size term which is responsive to a size of the modified color gamut shape.

17. The method of claim 16 wherein the size of the modified color gamut shape is characterized by a volume of the modified color gamut shape.

18. The method of claim 1 wherein the predefined distribution of input colors corresponds to the input colors in a set of reference input images.

19. The method of claim 1 wherein colorant control values are calibrated to be linear with colorant amount.

* * * * *